United States Patent Office 3,562,210
Patented Feb. 9, 1971

3,562,210
ELASTOMERIC COMPOSITION CONTAINING PHOSPHITE ESTER AND POLYESTER STABILIZERS
Richard D. Cassar, West Chester, Pa., and Jackson S. Boyer, Northridge, Del., assignors to Sun Oil Company, Philadelphia, Pa., a corporation of New Jersey
No Drawing. Filed Mar. 10, 1969, Ser. No. 805,871
Int. Cl. C08f 45/58
U.S. Cl. 260—45.85                                          7 Claims

ABSTRACT OF THE DISCLOSURE

An elastomer composition having improved resistance to ultraviolet initiated discoloration comprising an elastomer containing 0.5 to 10.0 parts by weight per 100 parts of elastomer of a synergistic mixture of certain aryl and alkaryl phosphite esters with a polyester of a polymethylated muconic acid selected from the group consisting of $\alpha,\beta'$-dimethylmuconic acid, $\alpha,\alpha'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid and mixtures thereof with a polyethylene glycol of a molecular weight in the range of 100 to 1000, said polyester having a molecular weight in the range of 600 to 20,000.

CROSS REFERENCES TO RELATED APPLICATIONS

This present application is related to applicants' following copending applications: Ser. No. 691,129 filed Dec. 18, 1967 entitled "Alpha-Olefin Polymers Having Improved Ultraviolet Stability" now U.S. Patent No. 3,511,806; Ser. No. 691,153 filed Dec. 18, 1967 entitled "Ultraviolet Stabilized Petroleum Hydrocarbons"; Ser. No. 691,199 filed Dec. 18, 1967 entitled "Ultraviolet Stabilized Elastomeric Compositions"; Ser. No. 758,574 filed Sept. 9, 1968 entitled "Polymethylated Muconic Acids and Phosphite Ester Synergistic Stabilizer Combination for Elastomer Compositions"; Ser. No. 731,619 filed May 23, 1968 entitled "Stabilized Latex Emulsions"; and Ser. No. 777,476, filed Nov. 20, 1968 entitled "Plastic Surface Coverings of Improved Ultraviolet Stability," each of which discloses ultraviolet stability improved compositions containing polymethylated muconic acids and their hydrocarbyl esters. The present application is also related to applicants' copending United States applications Ser. No. 805,835, entitled "Alpha-Olefin Composition Containing Polyester Stabilizers," Ser. No. 805,874, entitled "Elastomeric Composition Containing Polyester Stabilizers," Ser. No. 805,872, entitled "Plastic Surface Coverings of Improved Ultraviolet Light Stability," and Ser. No. 805,819, entitled "Petroleum Hydrocarbon Compositions Containing Polyester Stabilizers," each of which are filed of even date herewith.

BACKGROUND OF THE INVENTION

The present invention relates to the improvement of ultraviolet stability of elastomers and particularly to vulcanized rubber compositions which normally discolor when exposed to ultraviolet light. Specifically, this invention relates to a synergistic mixture of additives which provide elastomer compositions with improved ultraviolet stability when incorporated therein.

In most applications, elastomer compositions normally are subject to exposure to ultraviolet light, either from sunlight or from artifical sources. Ultraviolet degradation in elastomers is usually noticeable in the form of crazing, cracking, or discoloration of the surfaces of the article. These effects are particularly noticeable on light-colored pigmented compositions, e.g., white sidewalls of tires.

UV degradation ultimately contributes to the loss of the attractive appearance of the elastomer as well as a loss in some physical properties thereby providing possible unsafe usage of the elastomer composition.

It has been reported by H. A. Winkelman in Industrial and Engineering Chemistry, vol. 44, No. 4, pp. 841–850, that deterioration of rubber products outdoors due to the action of sunlight and ozone is a problem of major concern to all manufacturers and consumers of rubber products. Automotive manufacturers each year face losses aggregating into thousands of dollars because of premature cracking and failure of rubber parts.

Recent advances in rubber technology are contributing to the development of long-life rubber compositions particularly suitable for use in automobile and truck tires. Primarily, these advances have been made in the development of abrasive-resistant treads which theoretically double the mileage life of a tire. However, altough the abrasive-resistance properties of tire treads have been substantially improved, the inherent susceptibility of elastomers to breakdown resulting from exposure to ultraviolet light remains an ever-present weakness. This weakness presents a primary limiting factor in the life of an automobile or truck tire or any of the many applications for which rubber is used.

Many organic rubber stabilizers such as N-isopropyl-N'-phenyl-p-phenylene diamine, N-phenyl-N'-cyclohexyl-p-phenylene diamine, 6 - ethoxy - 1,2 - dihydro-2,2,4-trimethyl quinoline, N,N'-di-(1 - methylheptyl) - p-phenylene diamine, and diphenyl - p - phenylene diamine homologs are presently being added to rubber compounds prior to molding and vulcanization to inhibit UV degradation. However, some of these additives either provide only limited protection or have staining characteristics which render them undesirable for many commercial applications.

More recently, several combinations of stabilizers when added to synthetic polymeric compositions have provided those compositions with synergistic improvements in ultraviolet stability. For example, Lichty United States Patent No. 3,027,351 dated Mar. 27, 1962 discloses a synergistic combination of certain organic acids and certain phenolic and amine stabilizers which provide unvulcanized rubbers with improved oxidation stability.

Williamson et al. United States Pat. No. 3,188,298 dated June 8, 1965 discloses the improvement in ultraviolet stability of crystalline alpha-monoolefin polymers achieved by use of a synergistic combination of certain derivatives of salicyclic acid or benzophene and certain organic phosphoric esters. Also, Cook United States Pat. No. 3,355,421 dated Nov. 28, 1967 and Seger United States Pat. No. 3,357,945 dated Dec. 12, 1967 disclose synergistic combinations of known stabilizers which have been shown to provide substantial improvement in the stability of synthetic polymeric compositions.

DESCRIPTION

It has now been discovered that polyesters prepared from certain polymethylated muconic acids and/or their hydrocarbyl esters copolymerized with certain polyethylene glycols when combined with aryl and/or alkaryl phosphite esters of the structural formula:

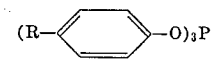

wherein R is selected from the group consisting of hydrogen and alkyl groups of 1 to 12 carbon atoms in an elastomer composition provide a new elastomer composition having a synergistic improvement in resistance to ultraviolet initiated degradation.

One component of the synergistic combination found to be suitable for use in the compositions of the persent invention are polyesters of polymethylated muconic acids with a polyethylene glycol or molecular weight in the range of 100 to 1000. These polyesters are characterized as being normally liquid at room temperature and having a molecular weight in the range of 600 to 20,000.

Polymethylated muconic acids that can be used in preparing polyesters suitable for use in the compositions of the present invention include the cis-cis, cis-trans and trans-trans isomers of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid and their monoesters wherein one carboxyl group is attached to a $C_1$ to $C_{20}$ hydrocarbyl radical, or their diesters wherein each carboxyl group is attached to a $C_1$ to $C_{20}$ hydrocarbyl radical, and mixtures thereof.

The $C_1$ to $C_{20}$ hydrocarbyl esters included in the present invention are selected from the hydrocarbyl radicals of $C_1$ to $C_{20}$ hydrocarbons having acyclic, cyclic, and aromatic structures such as those disclosed in the text "Handbook of Hydrocarbons," S. W. Ferris, Academic Press, Inc., New York, N.Y. (1955), pp. 145–249, all of which are incorporated herein by reference. The preferred esters of the present invention are the $C_1$ to $C_{10}$ hydrocarbyl mono- and di-esters of the polymethylated muconic acids disclosed above. Examples of the $C_1$ to $C_{10}$ hydrocarbyl groups include methyl, ethyl, butyl, pentyl, hexyl, heptyl, octyl, nonyl, decyl cyclopentyl, methyl cyclopentyl, dicyclopentyl, cyclohexyl, phenyl, tolyl, xylyl, naphthyl, tetrahydronaphthyl, decahydronaphthyl, as well as the various isomers of each.

The diester of the muconic acid can be a mixed ester. An illustrative example is the cis-cis isomer of $\alpha,\alpha'$-dimethylmuconic acid which can be illustrated by the following structural formula:

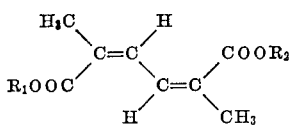

wherein $R_1$ is different from $R_2$. That is to say, $R_1$ can be a hydrocarbyl group of $C_1$ to $C_{20}$ and $R_2$ can be a different hydrocarbyl group of $C_1$ to $C_{20}$, e.g., $R_1$ equals cyclohexyl ($C_6$) and $R_2$ equals eicosyl ($C_{20}$).

Examples of some of the esters of the polymethylated muconic acids that can be used for preparing polyesters suitable for use in the compositions of the present invention include the cis-cis, cis-trans and trans-trans isomers of the mono- and di-methyl esters of $\alpha,\beta'$-dimethylmuconic acid; the mono- and di-phenyl esters of $\alpha,\alpha',\beta,\beta'$-tetramethylmuconic acid; the mono- and di-naphthyl esters of $\alpha,\beta,\beta'$-trimethylmuconic acid; the mono- and di-5,6-diethylacenaphthyl esters of $\alpha,\alpha'$-dimethylmuconic acid; the mono- and di-cyclohexyl ester of $\alpha,\alpha'$-dimethylmuconic acid; the mono- and di-1,2-dimethylcycloheptyl esters of $\alpha,\beta'$-dimethylmuconic acid; the mono- and di-decahydronaphthyl esters of $\alpha,\alpha',\beta,\beta'$-tetramethylmuconic acid; the mono- and di-1,3-dipropylbenzyl esters of $\alpha,\alpha'$-dimethylmuconic acid; the mono- and di-2,9-dimethyl-4,7-diisobutyldecyl esters of $\alpha,\alpha',\beta$-trimethylmuconic acid; and the mono- and di-anthracyl esters of $\alpha,\beta'$-dimethylmuconic acid; mono- and di-2,6,10-trimethyldecyl esters of $\alpha,\alpha',\beta,\beta'$-tetramethylmuconic acid; and the nonyl ethyl esters of $\alpha,\alpha',\beta$-tetramethylmuconic acid.

As noted above, polymethylated muconic acids can exist in three isomeric forms, viz. cis-cis, trans-trans and cis-trans. As an example, the unsaturated diacid, $\alpha,\alpha'$-dimethylmuconic acid, can be depicted by the following structural formulas:

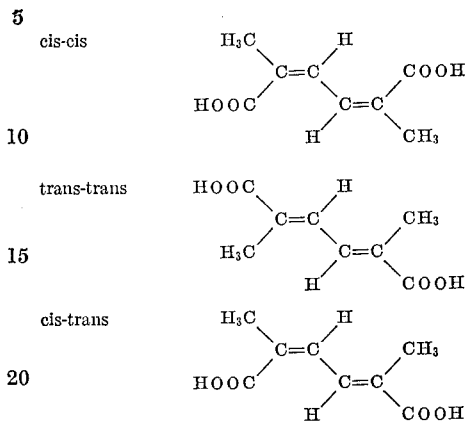

The preparation of each of these isomeric forms of the $\alpha,\alpha'$-dimethylmuconic acid has been described in the prior art by Elvidge et al., J. Chem. Soc., pp. 1026–1033 (1952). These authors show that oxidation of p-xylenol by means of peracetic acid gave the cis-cis form of the acid. The other isomeric forms were obtained indirectly by conversion of the cis-cis form. Also dimethylesters of each of the three isomeric forms were prepared by shaking the respective DMMA with ethereal diazomethane.

The cis-cis form of polymethylated muconic acids can also be obtained by biological oxidation of p-xylene utilizing special strains of microorganisms as disclosed in Raymond et al. United States Patent No. 3,383,289 issued May 14, 1968.

Procedures for recovering esters of the three isomeric forms of methylated muconic acids usable in the compositions of the present invention are also disclosed in United States application Ser. No. 561,736 filed June 30, 1966 now U.S. Patent No. 3,440,158 issued Apr. 28, 1969.

Polyethylene glycols suitable for use in preparing the polyester stabilizers of the present invention are generally represented by the structural formula:

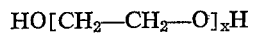

where $x$ equals any value in the range of 2 to 22. These polyethylene glycols are normally liquid at 25° C. and have a molecular weight in the range of 100 to 1000. Polyethylene glycols are well known standard articles of commerce. One method of preparing polyethylene glycols is disclosed in the text "Chemistry of Organic Compounds," Noller, Carl R., 2nd edition, W. B. Saunders Co., Philadelphia, Pa. (1958), p. 742. One method of preparing the polyesters herein disclosed is provided in United States Patent No. 3,429,949 issued Feb. 25, 1969 to Gary L. Driscoll. Also examples of polyester compositions suitable for use in the elastomeric compositions of the present invention and methods of their preparation are disclosed in United States patent application Ser. No. 805,818 by Gary L. Driscoll, filed of even date herewith.

The phosphite esters suitable for use in the compositions of the present invention are structurally defined by the formula:

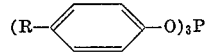

wherein R is selected from the group consisting of hydrogen and alkyl groups of 1 to 12 carbon atoms. Examples of some of the phosphite esters suitable for use in the compositions of the present invention include triphenyl phosphite, tris-4-methylphenyl phosphite, tris-4-propylphenyl phosphite, tris-4-butylphenyl phosphite, tris-4-t-butyl phenyl phosphite, tris-4-hexylphenyl phosphite, tris-4-octylphenyl phosphite, tris-4-nonylphenyl phosphite, tris-4-dodecylphenyl phosphite and others.

The polymethylated muconic acid polyesters and the phosphite ester additives as hereinabove disclosed can be added separately or combined to the elastomer composition. By either method, the combination is referred to as a synergistic mixture.

The preferred ratio of polymethylated muconic acid polyester to phosphite ester in the composition is 1:1; however, any combination in the range of 0.25 to 9.75 parts phosphite ester to 0.25 to 9.75 parts of polymethylated muconic acid polyester is suitable with the provision that the combination of additives in the elastomer composition is in the range of 0.5 to 10.0 parts additive per 100 parts of elastomer. The preferred concentration of the combined stabilizers in the elastomer composition is 1.0 to 5.0 parts combined stabilizers per 100 parts of elastomer.

By the term elastomer as herein disclosed is meant natural or synthetic polymers which exhibit the property of "long range elasticity." By long range elasticity is meant the ability of the polymer to undergo stretching to at least 150 to 200 percent of its original length and to retract very rapidly to virtually its original length when it is released. A full description of elastomers useful in the compositions of the present invention is disclosed in "The Encyclopedia of Chemistry," 2nd edition, Reinhold Publ. Co., New York, N.Y. (1966), pp. 359–362.

Included as elastomers are rubbers of either natural or synthetic origin.

By the term rubber as herein disclosed is meant natural or synthetic rubber that has been modified to increase its useful properties such as elasticity, toughness, resistance to abrasive wear, and others. The modification of the elastomer is accomplished usually by compounding or masticating the rubber with sulfur or other vulcanizing agents. The composition can also contain various other additives such as zinc oxide, carbon black, or other reinforcing pigments, fillers, softeners, extenders and antioxidants. The elastomer and additive composition is thereafter shaped and vulcanized. These compositions are chiefly used in tires, hose, belting, friction materials, containers, electrical insulating, and waterproofing materials, and can also be used in combination with textile fabrics and metals as well as other materials.

Examples of elastomers usable in the compositions of the present invention include natural and synthetic rubber compositions which are normally subject to ultraviolet initiated degradation. Natural rubber including Hevea braziliensis latex and synthetic rubber including butyl polymers, such as polybutene-1, polyisobutylene, polybutadiene, as well as styrene-butadiene copolymers (SBR), ethylene-propylene-dicyclopentadiene terpolymers, polyisoprene, neoprene (polychloroprene), acrylonitrile-butadiene polymers, among others, are included among the compositions of the present invention.

As a means of illustrating one mode of the present invention, the following evaluations are given. All parts and percentages as herein disclosed are given as parts by weight.

EXAMPLE I

A sample of raw styrene-butadiene rubber (SBR) containing 23.5 weight percent polymerized styrene and having a Mooney viscosity of 52 was compounded and vulcanized in the following manner:

100 parts of SBR were banded on a standard rubber mill while maintaining roll temperatures at approximately 73° F. After 2–3 minutes of milling the SBR, 10 parts of zinc oxide, 10 parts of titanium dioxide, 2.0 parts sulfur and 1.75 parts benzothiazyl disulfide were blended with the rubber and the whole composition was milled for about thirty minutes to provide complete dispersion of additives in the rubber. The rubber composition was thereafter sheeted to provide rubber specimens having the dimensions of 6 x 6 x .075 inches. The rubber sheets were subsequently vulcanized at a temperature of 300° F. for about 45 minutes. The vulcanized sheets were then quenched with cold water and dried.

The vulcanized rubber samples were thereafter evaluated for ultraviolet stability by exposing each sample to ultraviolet light for periods of 24, 28 and 72 hours in accordance with the procedures outlined in ASTM D925–55.

One noticeable effect of exposure of white rubber compositions to ultraviolet light is discoloration of the sample in the form of increased yellowness. The increase in intensity of the yellowness of the rubber sample is usually indicative of the increased degradation of the rubber initiated by ultraviolet light. The intensity of yellowness of the rubber samples herein tested were determined on a Photo Volt Corporation Model 610 Reflectometer having a standard blue filter. The results of this evaluation appear in the table under Example I. In the determination the intensity of yellowness is inversely proportional to the reflectance value shown on the Reflectometer. This Example I serves as a reference example illustrating one effect of ultraviolet light on an unstabilized elastomer composition.

EXAMPLE II

A polyester of the dimethyl ester of trans-trans $\alpha,\alpha'$-dimethylmuconic acid was prepared as follows:

A solution of 1500 g. of cis-cis dimethylmuconic acid obtained by biological oxidation of p-xylene and dissolved in 10 liters of 6 N NaOH was refluxed for 24 hours, diluted with 5 volumes of distilled water, and brought to pH 3 with 12 N HCl. The solid which separated at this point was filtered off and dried; it contained about 80% of the trans-trans acid, with a lesser amount of the cis-trans acid and a minor amount of the cis-cis acid.

The crude product thus obtained is esterified by refluxing it (1400 g.) in 10 liters of methanol containing 10 cc. of concentrated $H_2SO_4$ until solution occurs. Cooling the reaction mixture yields the dimethyl ester of the trans-trans acid in substantially pure form (M.P. 102°–104° C.).

582 grams of the above-disclosed dimethyl $\alpha,\alpha'$-dimethyl, trans-trans muconate, 1170 grams of polyethylene glycol having an average molecular weight of about 300 were blended and heated in a glass polymerization vessel under a nitrogen atmosphere until the entire blend becomes molten. The melt was thereafter maintained at 200° C. while 4.0 cc. of tetraisopropyl titanate catalyst was added and maintained at that temperature for 12 hours under continuous agitation. The resultant liquid product was vacuum distilled at 1 mm. Hg pressure for 3 hours. The residue recovered comprised 1500 grams of a thick viscous polyester liquid which had a Brookfield viscosity of 1670 centipoise measured at 60 r.p.m. using a #4 spindle.

EXAMPLE III

A rubber composition identical to that of Example I was compounded and cured in the identical manner as Example I with the exception that 1.25 parts of the polyester prepared as disclosed in Example II above was added to the rubber composition during the compounding step. This rubber sample was evaluated in the identical manner as the rubber compositions of Example I. The results of this evaluation appear in the table under Example III.

EXAMPLE IV

Example I was repeated with the exception that 1.25 parts of tris-4-nonylphenylphosphite was added to the rubber composition during the compounding step. The results of this evaluations appear in the table under Example IV.

EXAMPLE V

Example I was repeated with the exception that 0.625 part of the polyester disclosed in Example II and 0.625 part of tris-4-nonylphenylphosphite were added to the rubber composition during the compounding step. The results of this evaluation appear in the table under Example V.

For purposes of convenience in the present disclosure, the stabilizer selected from the group of additives which include the polymethylated muconic acid polyesters herein disclosed is referred to as additive "A." And in the same manner, a stabilizer selected from the phosphite esters disclosed herein is referred to as additive "B."

TABLE

| Ex. | Part of additives | No u.v. | 24 hrs., u.v. | 48 hrs., u.v. | 72 hrs., u.v. |
|---|---|---|---|---|---|
| I | None | 91.0 | 37.5 | 19.0 | 18.5 |
| III | 1.25 parts additive "A" [1] | 90.0 | 41.0 | 37.0 | 34.0 |
| IV | 1.25 parts additive "B" [2] | 79.0 | 37.0 | 39.0 | 35.0 |
| V | {0.625 part "A" / 0.625 part "B"} | 86.0 | 48.0 | 48.0 | 45.0 |

[1] Polyester composition disclosed in Example II;
[2] Tris-4-nonylphenyl phosphite.

As can be seen from the results of Example I given in the table, prolonged exposure to ultraviolet light reduces the reflectance value of unstabilized rubber indicating an increase in yellowness of the rubber. The more intense the yellowness of the rubber, the greater the degree of ultraviolet initiated degradation that has taken place in the rubber.

An ultraviolet stability evaluation of unstabilized rubber is represented by the data given in the table under Example I. The stability improvement achieved in SBR by incorporating only the polymethylated muconic acid polyester additive or tris-4-nonylphenyl phosphite is set forth in the table under Examples III and IV, respectively. Example V reveals the unexpected synergistic improvement achieved in SBR by combining the additives shown separately in Examples III and IV.

The reflectance values for each sample given above was measured on a Photovolt Corporation Model 610 Reflectometer having a tungsten lamp and a blue filter lense. The test comprises subjecting the sample to be tested to the photoelectric cell of the Reflectometer and reading the amount of reflectance for that sample directly from the scale of the galvanometer of the instrument.

In the above-given series of evaluations, the photoelectric cell was adjusted for yellowness determinations in the following manner:

(a) A grey ceramic tristimulus color evaluation plaque having a blue color value of 48.0, a green color value of 45.0 and an amber color value of 44.0 was placed on the face of the photoelectric cell and the galvanometer was adjusted to a value of 50, and (b) A white ceramic tristimulus color evaluation reference plaque having a blue color value of 75.5, a green color value of 74.5 and an amber color value of 74.0 was placed on the face of the photoelectric cell and the galvanometer scale was adjusted to a reading of 100. Each sample tested was thereafter placed on the face of the photoelectric cell and the reflectance value for the sample was taken as a direct reading from the galvanometer scale. The values achieved by this method are relative values and provide a basis for comparison of intensity of yellowness of the samples. Another procedure which is equally useful in determining the yellowness of white rubber is disclosed in ASTM D1925-63-T.

The present examples illustrate the evaluations on white pigmented rubber. However, any rubber containing any form of pigmentation fillers, extenders or other additives normally associated with vulcanized rubber including carbon black can be used in the compositions of the present invention and achieve improved resistance to ultraviolet degradation.

Elastomer compositions other than SBR can be combined with the synergistic ultraviolet stability improving additive combination disclosed hereinabove within the scope of the present invention to provide results analogous to those disclosed in said samples. Such compositions are included within the scope of the compositions of this invention.

Ultraviolet stability improving polyester additives prepared from polymethylated muconic acids other than the dimethyl ester of trans-trans $\alpha,\alpha'$-dimethylmuconic acid set forth in the examples given above can be substituted therefor in any of the elastomer compositions disclosed and provide analogous results. Included among these additives are the polyesters prepared from the cis-cis, cis-trans and trans-trans isomers of any of the polymethylated muconic acids disclosed above as well as those isomers of the mono esters of each of these acids wherein the ester is a $C_1$ to $C_{20}$ hydrocarbyl group and also the diesters of each of these acids wherein each ester is a $C_1$ to $C_{20}$ hydrocarbyl group. Any combination of the above-disclosed stability improving phosphite ester and polymethylated muconic acid polyester additives with any of the disclosed elastomers provide results analogous to those disclosed in the examples disclosed herein.

Also, any of the phosphite esters hereinabove disclosed can be substituted for the tris-4-nonylphenylphosphite disclosed in the examples with analogous results being obtained.

The invention claimed is:

1. An elastomer composition comprising an elastomer selected from the group consisting of natural rubber and synthetic rubber derived from an ethylenically unsaturated monomer having incorporated therein 0.5 to 10 parts of a two component ultraviolet stability improving mixture per 100 parts of elastomer, said mixture comprising (a) 0.25 to 9.75 parts of component "A" which is a polyester of a polymethylated muconic acid selected from the group consisting of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, $\alpha,\alpha',\beta,\beta'$ - tetramethylmuconic acid and mixtures thereof with a polyethylene glycol having a molecular weight in the range of 100 to 1000, said polyester having a molecular weight in the range of 600 to 20,000, and (b) 0.25 to 9.75 parts of component "B" which has the structural formula

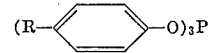

wherein R is selected from the group consisting of hydrogen and alkyl groups of 1 to 12 carbon atoms.

2. A composition according to claim 1 wherein the elastomer is an ethylene-propylene copolymer.

3. A composition according to claim 1 wherein the elastomer is styrene-butadiene rubber.

4. A composition according to claim 3 wherein component "B" is tris-4-nonylphenylphosphite.

5. A composition according to claim 4 wherein the stabilizer mixture is present in the range of 1.0 to 5.0 parts per 100 parts of elastomer.

6. A composition according to claim 4 wherein components "A" and "B" are present in about equal quantities.

7. A composition according to claim 1 wherein the stability improving mixture is present in the range of 1.0 to 5.0 parts per 100 parts of elastomer.

References Cited

UNITED STATES PATENTS 3,256,312   6/1966   Strobel _____ 260—45.85

M. J. WELSH, Primary Examiner

V. P. HOKE, Assistant Examiner

U.S. Cl. X.R.

260—41, 41.5, 45.7, 810, 814, 815, 820, 873